US009010367B2

(12) United States Patent
McCormick et al.

(10) Patent No.: US 9,010,367 B2
(45) Date of Patent: Apr. 21, 2015

(54) ELECTRONIC PROPORTIONER USING CONTINUOUS METERING AND CORRECTION

(75) Inventors: Martin P. McCormick, Forest Lake, MN (US); Richard T. Mallum, Maple Grove, MN (US); Jeffrey G. Zinn, Roseville, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 720 days.

(21) Appl. No.: 13/259,255

(22) PCT Filed: Mar. 9, 2010

(86) PCT No.: PCT/US2010/026631
§ 371 (c)(1),
(2), (4) Date: Sep. 23, 2011

(87) PCT Pub. No.: WO2010/111027
PCT Pub. Date: Sep. 30, 2010

(65) Prior Publication Data
US 2012/0045346 A1 Feb. 23, 2012

Related U.S. Application Data

(60) Provisional application No. 61/163,608, filed on Mar. 26, 2009, provisional application No. 61/171,180, filed on Apr. 21, 2009.

(51) Int. Cl.
*B67D 7/08* (2010.01)
*F04B 49/22* (2006.01)
*G05D 11/00* (2006.01)

(52) U.S. Cl.
CPC ................................. *G05D 11/005* (2013.01)

(58) Field of Classification Search
USPC ........ 137/565.29, 565.3, 565.33, 899, 899.4;
222/145.5–145.6, 63, 1; 417/46, 403
See application file for complete search history.

(56) References Cited

U.S. PATENT DOCUMENTS

| 4,026,439 | A | * | 5/1977 | Cocks ............................. 222/49 |
| 4,494,676 | A | * | 1/1985 | Berweger ........................ 222/63 |
| 4,505,405 | A | * | 3/1985 | Kelly et al. .................... 222/135 |
| 5,332,125 | A | * | 7/1994 | Schmitkons et al. ............. 222/1 |
| 5,407,267 | A | * | 4/1995 | Davis et al. ................ 366/152.1 |

(Continued)

OTHER PUBLICATIONS

Wagner TwinControl brochure pulled from internet, not dated, and pdf creation date of Jan. 26, 2010 information.

(Continued)

*Primary Examiner* — Craig Schneider
*Assistant Examiner* — Nicole Wentlandt
(74) *Attorney, Agent, or Firm* — Douglas B. Farrow

(57) ABSTRACT

The controller of the plural component proportioner (10) dispenses both components (or all three if a three component material) as necessary to maintain the correct mix ratio. The fluid displacement measuring technique described allows this proportioning to take place with the "A" or main component pump always able to supply fluid to the spray gun without being stopped. The "B" component, at a higher pressure, is added as necessary to control ratio. The control can determine whether the pumps were properly loaded with fluid, and the fluid was properly compressed for accurate measurement. This technique allows for the proportioned fluids to be provided to the spray gun(s) at high flow rates and consistent spray pressure without interruption.

3 Claims, 2 Drawing Sheets

(56) References Cited

U.S. PATENT DOCUMENTS

| | | | |
|---|---|---|---|
| 5,490,726 A * | 2/1996 | Davis et al. | 366/152.1 |
| 5,507,412 A * | 4/1996 | Ebert et al. | 222/63 |
| 6,896,152 B2 * | 5/2005 | Pittman et al. | 222/57 |
| 2006/0144447 A1 * | 7/2006 | Pittman et al. | 137/565.29 |

OTHER PUBLICATIONS

WIWA FlexiMix brochure pulled from internet, not dated, and pdf creation date of Sep. 12, 2008 information.

* cited by examiner

ELECTRONIC PROPORTIONER USING CONTINUOUS METERING AND CORRECTION

This application claims the benefit of U.S. Application Ser. No. 61/163,608, filed Mar. 26, 2009 and 61/171,180, filed Apr. 21, 2009, the contents of which are hereby incorporated by reference. Related applications include U.S. Application Ser. No. 60/186,405, filed Mar. 2, 2000, PCT application serial number PCT/US01/006,904 filed Mar. 2, 2001, U.S. Application Ser. No. 60/333,697, filed Nov. 27, 2001 and U.S. application Ser. No. 10/496,427 filed May 20, 2004, the contents of which are also incorporated by reference.

TECHNICAL FIELD

Background Art

Proportioners such as those shown and described in the above applications, the contents of which are hereby incorporated by reference, are sold in the market by the assignee of the instant invention under the trademarks VALUEMIX® and XTREMEMIX™.

DISCLOSURE OF THE INVENTION

In the instant invention, each of a pair (or more) of air-operated reciprocating piston pumps (such as those sold by the assignee of the instant invention) is provided with a linear displacement transducer (LDT) which is capable of communicating (as discussed in the aforementioned applications) a precise indication of the linear position of the air motor and pump rod as well as a reed switch or other sensor on the air motor to indicate changeover is taking place.

Unlike the aforementioned VALUEMIX (which sequentially dispenses first one component and then the other of a plural component material), the controller of the instant invention dispenses the A component continuously and doses the B component in order to maintain ratio at the end of each predetermined volume of material (the total of A and B).

Cavitation, air entrainment, compressibility, or poor inlet check performance all can result in a loss of correlation between pump travel and fluid dispensing. The following process is meant to correct for these issues. First, the controller determines when the pump has changed over. This is determined by a reed switch located in the air valve of the air motor. As the air valve starts to change over, this allows the pump to compress any gases and positively close the check valve. Once the check closes and gasses have been compressed, pressure starts to rise and at the point, an outlet pressure sensor indicates that pumping has started. The position of the pump at that point is starting value for fluid dispensed on that stroke.

The accuracy of fluid proportioning, and our rate and volume reporting, is wholly dependent on interpreting movement of the positive displacement pump, as actual fluid displaced out of the pump.

This fluid displacement is effected by several main factors:
  Ball checks opening and closing on motor direction change (change-over)—the air motor will accelerate without displacing fluid until the ball check closes (typically 0.10-0.30" travel.)
  Fluid compression—when the inlet check closes, (top change-over), all the fluid just brought into the pump must be compressed to outlet pressure. The bottom change-over doesn't do this because the fluid is all at outlet pressure. The smaller piston check simply closes as the rod starts back up.
  Loading cavitation—caused by a combination of heavy viscosity, lack of feed pressure, and high flow rate. Cavitation can cause some fluids to "de-gas" while under vacuum, and should be avoided.

When ball checks are closed and fluid pressure is within a normal range, pump rod movement can be considered positive displacement. Desired resultant fluid output data should closely follow the output data from a positive displacement flow meter reading the actual fluid displaced from the pump.

The following inputs and devices are utilized:
  Linear displacement transducers integral in motors, giving an analog output.
  Reed switches integral in motors, which indicate top and bottom change-over initiation.
  Pressure transducers reading fluid pressure at pump outlet giving an analog output.
  Spring loaded check valve, which isolates the pump and pressure transducer from down stream pressure and volume accumulated in bulk outlet hoses.

The fundamental idea is to use the inputs above to identify the change-over "window" for every pump changeover as seen in the graph. The window will be the amount of displacement of the linear transducer that won't be counted as flow. Pump flow can be fluctuating or stopping at any time. However, once a change-over starts, it will finish, whether to stall, or resume flowing. The window should be defined as follows:
  Motor reed switch signals start of the change-over window—stop counting flow at this linear position.
  Pressure transducer signal drops fast—when the signal starts back up, resume counting linear position. The user may want to adjust this point to be a percentage rise of running pressure, or a fixed pressure added to the point where the pressure started back up, especially for the top change-over.
  Provide a settable fluid "compressibility" fudge factor to allow window adjustment for testing with actual protective coatings that may compress differently than oil.
  Monitor warning and alarm set points for excessive pump cavitation.

The B pump has a higher-pressure ratio than the A pump. The higher pressure is in the range of 10-20% and preferably about 15%) This is to allow the B fluid to be controlled and injected at the mix point regardless of the A pressure already acting against the B mix manifold check valve.

The A&B motors are run from a common air regulator, which can be adjusted by the operator as necessary to control overall pressure and spray pattern.

The A pump is allowed to run freely when in Run/Spray mode. The operator can trigger the spray gun at will. When de-triggered, the A pump is allowed to stall against the gun at full pressure.

The B flow is controlled with an air operated fluid valve. This valve is controlled to dose "B" material in to the "A" stream at least every 500 milliseconds. In the preferred embodiment, the minimum length of dosing is on the order of 70 milliseconds making the desired range 70-500 milliseconds.

An adjustable restrictor is provided at the mix manifold "marry" block to bring the flow rate of the "B" material into a useable range.

The target for how often and how long the "B" valve is open is developed based on Ratio set point as a % of A pump flow, current ratio, and past ratio error from the totalizers.

Closing the loop for the B side will be the corrected displacement data from that pumps sensors. At the widest mix ratio's this data will be coming in 10 times slower than the A pump data.

Flow will be impacted by:

Randomly timed changeovers of either pump.

Motor imbalance. The Graco NXT 6500 has approx 1.75% more area on the down stroke vs the upstroke. The 3500-size motor has approx 3.35% more, and 5.2% for the 2200. The King motor had 1.9% imbalance.

Gun triggering on and off randomly.

When the one or both pumps are pressure fed, the upstroke can be boosted by 2 psi for every 1 psi of feed pressure at static. Air regulators should be used to control feed pumps with greater than a 1:1 pressure ratio.

If the above control can't stay within limits in all situations, the A or B on/off metering valves can be briefly cycled "Off" for a coarse adjustment to get back within limits.

The B on/off metering valve will be closed any time it can be determined the spray gun has closed. This is to keep the higher B pressure from continuing to bleed through to the mixed material point.

There are two reasons for gun-closed detection. It serves as an indication of when to close the B shut-off valve to keep the higher pressure from bleeding through to the mix manifold (when remote).

It works in calculating flow rates for display and data logging. Flow rates will be calculated from "gun open" information only, and not updated unless new "gun open" information is available. If the operator stops spraying and puts down the gun, he or she should be able to go back to the machine and view the last spraying flow rate.

When the spray gun closes, the A pump won't suddenly stop. It will slow dramatically, and comes to a stalled position. How much pump movement happens after gun closing depends on:

How much hose is on the machine;

How compressible the hose is;

How much pressure drop exists across the hose while flowing;

How compressible the fluids are.

The stall will be indicated by a sharp rise on the A pressure transducer, accompanied by a marked flattening of the linear transducer signal. Once a stall is detected it may be desired to back date any flow calculations somewhat to keep the rate reading accurate.

Pressures need to be calculated for display, and logged to data. Only use the pressures data that aren't "windowed out" by the pump displacement calculations above. The system needs to have time based filtering to give a meaningful but not jittery display.

It may be desirable to add some pressure based errors such as excessive delta P, not enough delta P for metering, too much pressure for circ mode, etc.

In spray mode, all fluid counted is logged as consumed in the process. "A", "B" totals are kept and A/B ratio total is kept. An A/B running ratio is updated every "X" time or distance and displayed and kept. The Proportion control loop target needs to be adjusted with bias from A&B totalizers to keep ratio of running totals within 2% of set point ratio.

A "No-Leak" test will be performed every time "Spray Mode" is selected. (Verifies Circulation valves are closed and checks for any other leaks) Close A+B on/off metering valves, wait 50 ms. Open A+B motor pilot valves. Wait X seconds for system to stall against the gun. If either motor linear transducer sees continued movement, stop spray mode, and display error. A-side leakage, B-side leakage, or both sides leaking. After passing test, run Proportioning loops as described above. During spray mode operation, close B on/off metering shut-off valve at gun close detection. After a bottom change over has occurred, check for runaway fault (pump is running faster than 60 cpm). After a top change over has occurred, check for maximum cavitation warning, or alarm. It is desirable to have a minimum pressure requirement to stay in spray mode.

The following process is used to independent Run/Circulate Pump A (and/or Pump B):

Turn on blue A (and/or B) LED

Open fluid on-off metering valve A (and/or B) and wait 50 msec. before open solenoid valve for air motor A (and/or B).

Operator will control flow on/off or rate with manual circulation valve adjustment.

Every 10 (or other predetermined figure) seconds check for a predetermined maximum (corrected) pressure. This will require the operator to turn down the pump pressures to avoid excessive wear during circulation, and prevent the operator from spraying in circulation mode. The 10 second window will allow the operator to turn down the pressure after quieting the alarm by relieving excess pressure.

If a pump is run faster than 500 msec. per stroke (60 cpm) for more than 10 seconds, close the solenoid valve for that air motor and activate the Runaway alarm.

When stopping circulation mode, close the fluid on/off metering valve(s) and the solenoid valve(s) for air the motor(s).

The following process Pump Check A and Pump Check B (sequentially) checks valves and packings for leakage and verifies that the correct pump sizes are selected at setup.

Open fluid on-off metering valve A and wait 50 msec. before opening solenoid valve for air motor A.

Operator opens the A sample valve into a graduated beaker.

Run pump for minimum 1 full cycle and then close fluid on/off metering valve when pump reaches 1-inch from bottom (on the down stroke). Check for full stall on the linear transducer in X seconds. Stall or not, proceed to 8.3.

Continue to run pump into Up stroke and close fluid on/off metering valve when pump reaches 1-inch from top on the up stroke. Check for full stall on the linear transducer in X seconds.

If the pump didn't stall in 8.2 only output error "Pump X Intake Valve Failed"

If the pump didn't stall in 8.3 only output error "Pump X Piston Valve Failed"

If the pump didn't stall in 8.2 and 8.3 output error "On/Off Control Valve X Failed or Circulation valve is open"

Continue dispensing fluid to a target quantity of 750 ml. If both beakers have exactly 750 ml, then the correct pumps are selected.

Close the fluid shut-off valve and the solenoid valve for air motor A when finished metering, or the stop button is pushed, or an error occurs.

Repeat steps above for the B pump.

The following steps are for the Batch Ratio Dispense Test:

Open fluid on-off metering valve A and wait 50 msec. before opening solenoid valve for air motor A. Light A blue LED Check user input for desired sample size and calculate A totalizer target to dispense, based on mix ratio selected.

Dispense pump A through sample valve (manually) to the calculated target. Then close fluid valve and motor solenoid and turn off blue LED. Operator will close sample valve.

Open fluid valve B and then wait 50 msec. before opening solenoid valve for air motor B. Light B blue LED.

Calculate B dispense volume target based on actual A volume dispensed divided by Ratio set point.

Dispense pump B through sample valve (manually) to the calculated target. Then close fluid valve and motor solenoid and turn off blue LED. Operator will close sample valve.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
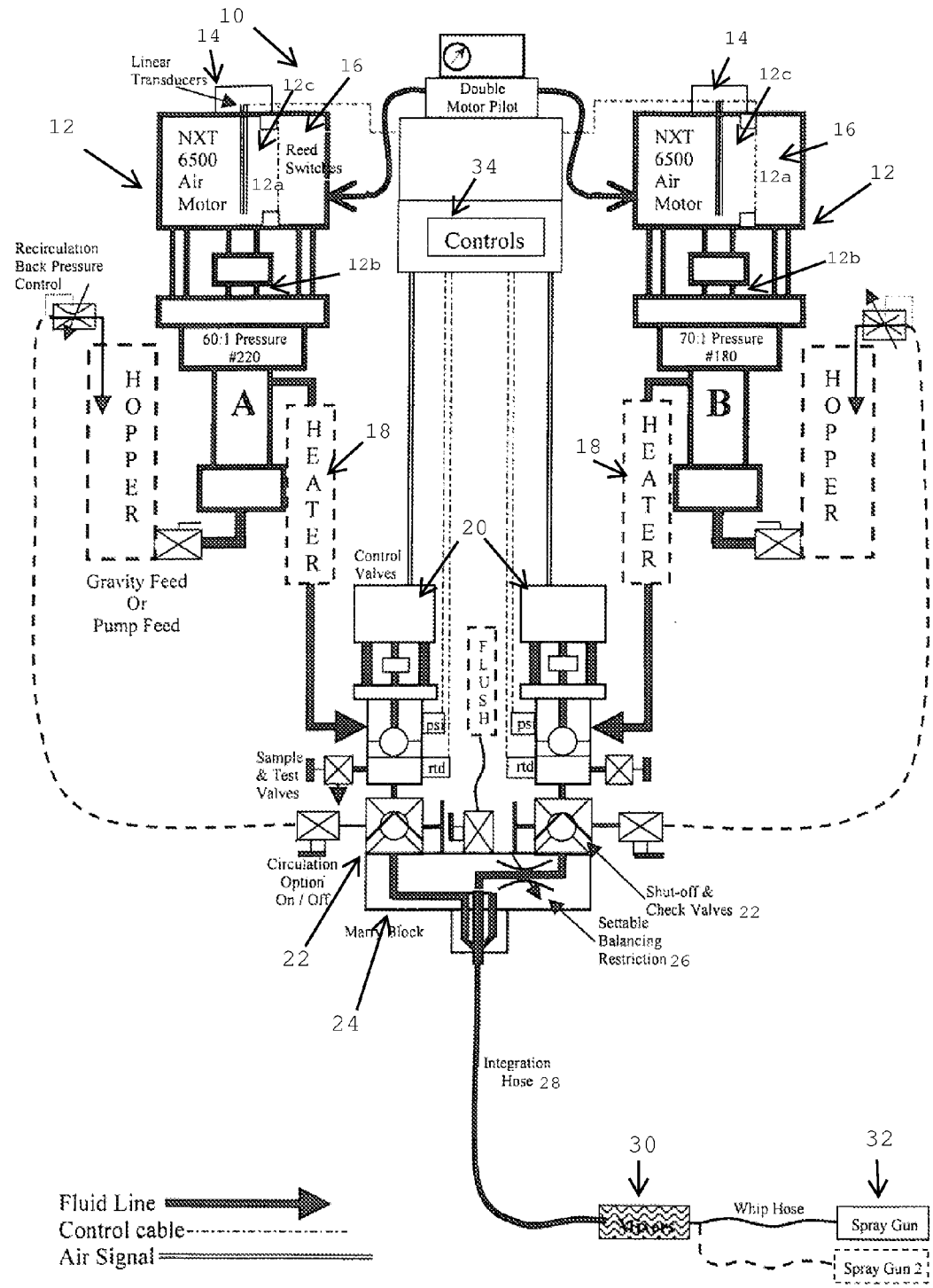
FIG. 1 is a schematic diagram of the instant invention.
Figure 2:
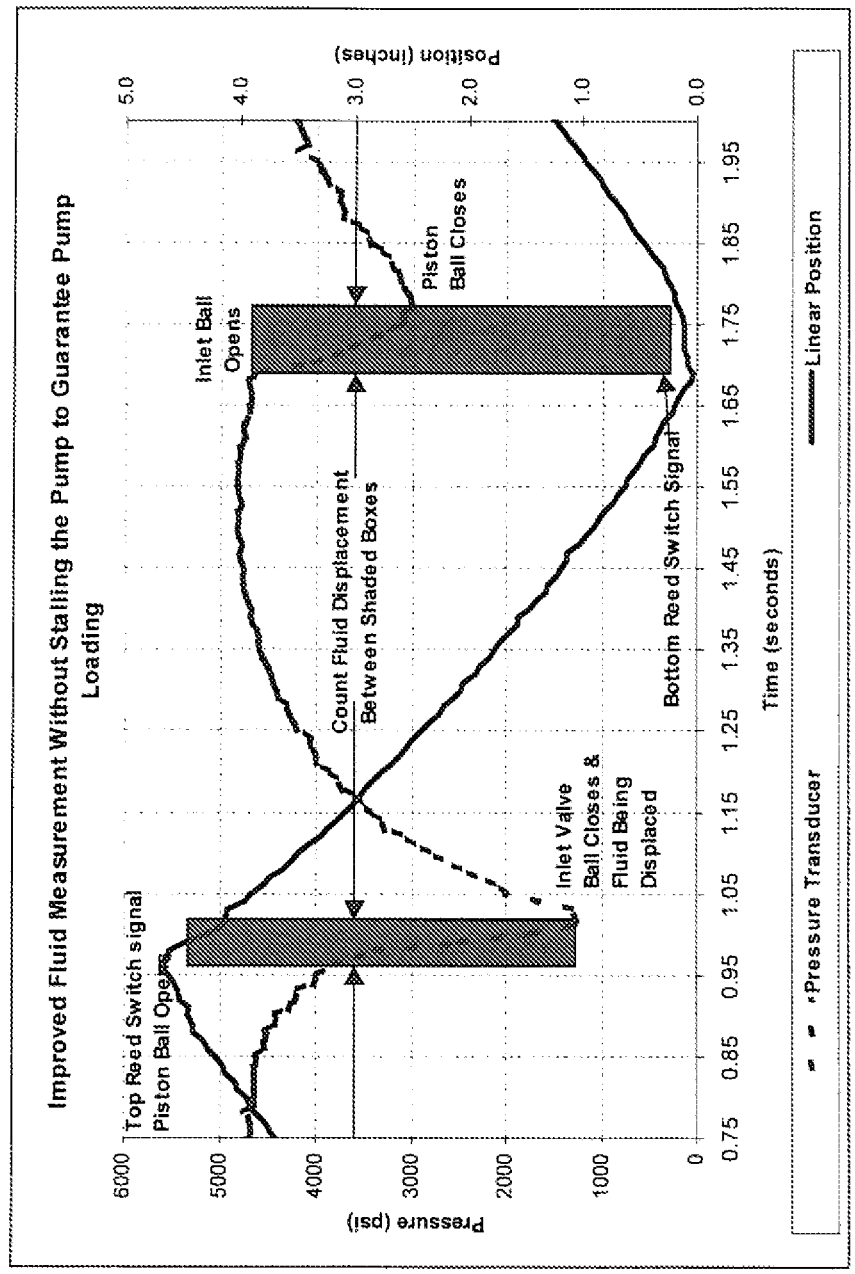
FIG. 2 is a graph showing pressure vs. time and position.

In the instant invention 10, each of a pair (or more) of air-operated reciprocating piston pumps 12 (such as those sold by the assignee of the instant invention under the trademark NXT™) is provided with a linear displacement transducer (LDT) 14 which is capable of communicating (as discussed in the aforementioned applications) a precise indication of the linear position of the air motor 12a and pump rod 12b. Of course any reciprocating power source may be used to power the pump rod 12b but such source must also have reed switches 16 on the air valve 12c or other equivalent sensor to determine when the air valve and the pump are changing over to the opposite direction. The LDT 14 provides an output in units of travel or resolution which may vary with the model used. In the preferred embodiment, the resolution may be in the range of 0.002-0.006 inch.

Pumps 12b may be gravity fed or pump fed and may optionally be provided with heaters 18 on the output side depending on the material being proportioned. The outputs of pumps 12b are fed to first and second control valves 20 which can start and stop the flow of components A and B respectively. The outputs of control valves 20 are connected to check valves 22 which may also contain shutoff valves. These check valves 22 help prevent the two materials from backing up and mixing prematurely. Check valves 22 are located at the inlets of marry block 24 which combines the two materials A and B. An adjustable restrictor 26 is provided on the B side to prevent the higher pressure B flow from overpowering the A side.

A hose 28 serves to integrate the two materials and feeds a mixer 30 which in turn feeds one or more spray guns 32 or other known application device. Controller 34 operates the elements above to control the ratio.

It is contemplated that various changes and modifications may be made to the proportioner without departing from the spirit and scope of the invention as defined by the following claims.

The invention claimed is:

1. A method for dispensing plural component materials having at least first and second parts to be mixed in a predetermined ratio, an apparatus having first and second reciprocating pumps connected to said first and second parts, each said pump having a displacement transducer, a valve controlling the direction of each said pump and a sensor for detecting the position of said valve to determine changeover, the method comprising the steps of:

dispensing a first part constantly at a predetermined pressure from said first pump;

dispensing a second part intermittently at a second pressure higher than said predetermined pressure from said second pump; and providing a restrictor at the output of said second pump to limit flow of said second part and maintain the correct ratio.

2. The method of claim 1 further comprising the steps of:
disregarding any travel starting when said position sensor detects changeover; and
resuming considering travel when said outlet pressure sensor measures a predetermined pressure corresponding to resumption of actual flow.

3. A method for compensating for changeover in a reciprocating pump having a check valve where said pump has a displacement transducer for measuring pump travel, a valve controlling the direction of said pump, a sensor for detecting the position of said valve to determine changeover and an outlet pressure sensor, the method comprising the steps of:

disregarding any travel starting when said position sensor detects changeover; and resuming considering travel when said outlet pressure sensor measures a predetermined pressure corresponding to resumption of actual flow.

* * * * *